United States Patent
Bates et al.

(10) Patent No.: US 8,265,933 B2
(45) Date of Patent: Sep. 11, 2012

(54) SPEECH RECOGNITION SYSTEM FOR PROVIDING VOICE RECOGNITION SERVICES USING A CONVERSATIONAL LANGUAGE MODEL

(75) Inventors: Cary L. Bates, Rochester, MN (US); Brian P. Wallenfelt, Rochester, MN (US)

(73) Assignee: Nuance Communications, Inc., Burlington, MA (US)

( * ) Notice: Subject to any disclaimer, the term of this patent is extended or adjusted under 35 U.S.C. 154(b) by 1145 days.

(21) Appl. No.: 11/316,263

(22) Filed: Dec. 22, 2005

(65) Prior Publication Data

US 2007/0150278 A1 Jun. 28, 2007

(51) Int. Cl.
*G10L 21/00* (2006.01)

(52) U.S. Cl. .......................... 704/270; 704/251

(58) Field of Classification Search .............. 704/256, 704/270, 275
See application file for complete search history.

(56) References Cited

U.S. PATENT DOCUMENTS

| | | | | |
|---|---|---|---|---|
| 5,444,617 A * | 8/1995 | Merialdo | | 704/9 |
| 6,188,976 B1 * | 2/2001 | Ramaswamy et al. | | 704/9 |
| 6,345,249 B1 * | 2/2002 | Ortega et al. | | 704/244 |
| 6,363,348 B1 * | 3/2002 | Besling et al. | | 704/270.1 |
| 6,484,136 B1 * | 11/2002 | Kanevsky et al. | | 704/9 |
| 6,754,626 B2 * | 6/2004 | Epstein | | 704/235 |
| 6,799,162 B1 * | 9/2004 | Goronzy et al. | | 704/244 |
| 6,823,307 B1 * | 11/2004 | Steinbiss et al. | | 704/252 |
| 6,901,364 B2 * | 5/2005 | Nguyen et al. | | 704/235 |
| 7,310,601 B2 * | 12/2007 | Nishizaki et al. | | 704/240 |
| 2002/0111806 A1 * | 8/2002 | Franz et al. | | 704/255 |
| 2003/0200094 A1 * | 10/2003 | Gupta et al. | | 704/270.1 |
| 2004/0267527 A1 * | 12/2004 | Creamer et al. | | 704/235 |
| 2005/0049865 A1 * | 3/2005 | Yaxin et al. | | 704/239 |
| 2005/0137868 A1 * | 6/2005 | Epstein et al. | | 704/252 |

OTHER PUBLICATIONS

Berger et al. "Just-in-time language modelling", Proceeding of ICASSP, pp. 705-708, 1998.*

* cited by examiner

*Primary Examiner* — Jialong He
(74) *Attorney, Agent, or Firm* — Wolf, Greenfield & Sacks, P.C.

(57) ABSTRACT

Embodiments of the present invention provide a method, system and article of manufacture for adjusting a language model within a voice recognition system, based on text received from an external application. The external application may supply text representing the words of one participant to a text-based conversation. In such a case, changes may be made to a language model by analyzing the external text received from the external application.

27 Claims, 5 Drawing Sheets

SPEECH RECOGNITION SYSTEM FOR PROVIDING VOICE RECOGNITION SERVICES USING A CONVERSATIONAL LANGUAGE MODEL

BACKGROUND OF THE INVENTION

1. Field of the Invention

Embodiments of the present invention generally relate to the field of voice recognition software. In particular, embodiments of the invention are related to techniques for improving the accuracy of speech recognition software.

2. Description of the Related Art

Voice recognition systems are used to translate dictated speech into text. Typically, voice recognition systems monitor the sound patterns of a user's speech and match them with words using a predefined dictionary of sound patterns. The result is a prediction of the most probable word (or phrase) that was dictated. For example, voice recognition software may receive input from a microphone attached to a computer. While the user speaks into the microphone, the voice recognition system translates the user's voice patterns into text displayed on a word processor. Another example includes a business call center where callers navigate through a menu hierarchy using verbal commands. As callers speak into the telephone receiver, an automated agent attempts to translate the caller's spoken commands, and initiate some action based thereon.

One goal for a voice recognition system is to operate at a rate comparable to the rate at which a user is speaking. Matching a given voice pattern to the words in a large predefined dictionary, however, can be time consuming and require substantial computer resources. Another goal of a voice recognition system is to maximize accuracy, or conversely, to minimize errors in word translation. An error occurs when the voice recognition system incorrectly translates a voice pattern into the wrong textual word (or phrase). Such an error must be manually corrected, forcing the user to interrupt a dictation session before continuing. Therefore, to maximize the usefulness of the voice recognition system, it is desirable to minimize such errors. These two goals conflict, however, as greater accuracy may cause the voice recognition system to lag behind the rate at which a user dictates into the voice recognition system. If a voice recognition system operates too slowly, users may lack the patience to use the system.

As stated, voice recognition is a computationally intense task. For example, sound patterns may be measured using 10 to 26 dimensions or more, and then analyzed against the words in the dictionary. The more time spent analyzing sound patterns, the more accurate the results may become. Thus, accuracy in speech recognition may be sacrificed for speed of execution. To help compensate for this, many voice recognition systems use a tiered approach to word selection. A first tier often referred to as a "fast match," produces a very rough score used to select a set of candidate words (or phrases) that may match a given sound pattern. The voice recognition system then uses a language model to select the probability that a particular word (or phrase) was spoken. The voice recognition software reduces the set produced by the "fast match," based on what the language model determines is likely to have been spoken. This reduced set is passed to a much slower "detailed match" algorithm, which selects the best word (or phrase) from the reduced set, based on the characteristics of the voice pattern.

Additionally, many fields (e.g., the legal and medical professions), have their own distinct vocabulary. Accordingly, one approach to improving the accuracy of a language model has been to provide a special dictionary containing a selection of industry terms. Further, the probability of particular words being spoken may be adjusted within the language model for a group of professionals in a given field. Thus, these approaches improve the accuracy of a voice recognition system, not by providing a better understanding of a speaker's voice patterns, but by doing a better job of understanding what the speaker is likely to say (relative to what has already been said). Similarly, many voice recognition systems are configured to scan documents authored by a given user. Such voice recognition systems adjust the language model to more accurately calculate how often a word is likely to be spoken by that given user.

Currently, the most common language models are n-gram models, which assume that the probability of a word sequence can be decomposed into conditional probabilities for a given word, based on the words that preceded it. In the context of an n-gram language model, a trigram is a string of three consecutive words. Similarly, a bigram is a string of two consecutive words, and a unigram is a single word. The conditional probability of a trigram may be expressed using the following notation: Prob (w1 I w2, w3), which may be interpreted as "the probability that the word w1 will follow the words w2 and w3, in order."

Additonally, current voice recognition systems rely on a "dictation-based" language model. That is, the voice recognition systems often rely only on the person dictating words for translation. At the same time, as processing power improves, voice recognition systems are finding broader applications. For example, many computer users rely on "instant messaging" (IM) applications for exchanging short messages of text with other users. A voice recognition system may be used in conjunction with an IM application. That is a voice recognition system can be used to translate the spoken word into text which is thereafter inputted into the IM application. In an IM application session, a "conversation" may take place between two or more people entirely in a text based form. IM applications are available for virtually any computer system available today, and are also available on many other devices such as PDAs and mobile phones. When a user engages in an IM text based "conversation" with another user, using a voice recognition system to translate spoken word into text, a voice recognition system may still rely on the single user dictation based language model, despite the reality that a user may be engaging in a conversation that includes other participants. Because word usage probabilities may be dramatically different depending on the context of a "dictation" session and a "conversation" session, an n-gram language model may produce an unacceptable percentage of mistakes in translating one-half of a text based conversation. (e.g., an IM session between two conversation participants).

Accordingly, even using the n-gram language model with the adjustments described above, voice recognition systems still produce a substantial number of mismatches between voice patterns and the resulting translated text. Therefore, there remains a need for methods that will improve the accuracy of a voice recognition system.

SUMMARY OF THE INVENTION

The present invention generally provides a conversation based language model used to provide voice recognition services. In one embodiment, words "spoken" by a participant to a text based conversation may be supplied to a voice recognitions system.

One embodiment of the invention includes a computer-implemented method for providing voice recognition services using a conversational language model. The method generally includes receiving, as external text, a sequence of one or more words from an external application used by a first participant to a text-based conversation, and sampling a voice pattern of a second participant to the text-based conversation. The method generally further includes, selecting a set of n-grams that include at least some of the words from the external text, wherein each selected n-gram identifies a probability that a candidate word identified in the n-gram will follow a sequence of preceding words in the n-gram, comparing the candidate words identified by the n-grams included in the set of n-grams with the voice pattern to select a recognized word, and outputting a text based representation of the recognized word.

Another embodiment of the invention includes a computer-readable medium containing a program which, when executed, performs an operation for providing voice recognition services using a conversational language model. The operation generally includes receiving, as external text, a sequence of one or more words from an external application used by a first participant to a text-based conversation, and sampling a voice pattern of a second participant to the text-based conversation. The operation generally further includes selecting a set of n-grams that include at least some of the words from the external text, wherein each selected n-gram identifies a probability that a candidate word identified in the n-gram will follow a sequence of preceding words in the n-gram, comparing the candidate words identified by the n-grams included in the set of n-grams with the voice pattern to select a recognized word, and outputting a text based representation of the recognized word.

Another embodiment includes a computing device. The computing device generally includes a processor; and a memory configured to store an application that includes instructions which, when executed by the processor, cause the processor to perform operations for providing voice recognition services using a conversational language model. The operations generally include receiving, as external text, a sequence of one or more words from an external application used by a first participant to a text-based conversation, and sampling a voice pattern of a second participant to the text-based conversation. The operation generally further includes selecting a set of n-grams that include at least some of the words from the external text, wherein each selected n-gram identifies a probability that a candidate word identified in the n-gram will follow a sequence of preceding words in the n-gram, comparing the candidate words identified by the n-grams included in the set of n-grams with the voice pattern to select a recognized word, and outputting a text based representation of the recognized word.

Still another embodiment provides a computer-implemented method for providing voice recognition services using a conversational language model. The method generally includes, during an on-going network-based exchange of textual messages between at least a first participant and a second participant, sampling a voice pattern of the first participant, and converting the voice pattern into text at least in part on the basis of an incoming text message received from the second participant.

BRIEF DESCRIPTION OF THE DRAWINGS

So that the manner in which the above recited features, advantages and objects of the present invention are attained and can be understood in detail, a more particular description of the invention, briefly summarized above, may be had by reference to embodiments of the invention that are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide a method, system and article of manufacture for adjusting a language model within a voice recognition system based on environmental context or other external influences. In one embodiment, the language model may be adjusted based on text received from an external application. For example, the external application may supply text representing the words of one participant to a text-based conversation. In such a case, adjustments may be made to a language model by analyzing the external text received from the external application. For example, by accounting for the external text received from an Instant Messaging (IM) application, modifications may be made to certain n-gram probabilities.

Further, participant specific adjustments may be made to the language model, depending on the individuals participating in the text-based conversation. For example, two teenagers may speak with one another quite differently than when speaking with adults (e.g., parents, teachers). The changes made to the language model are then used in subsequent voice recognition activity.

As described above, instant messaging allows two or more individuals to engage in a text-based "conversation." People communicate via instant messaging by sending and receiving messages in text form. An individual uses an instant messaging software application to compose a message that will be sent to another user. This message is received in almost real time by the targeted user's instant messaging application. The user receiving the instant message may then respond to the sender. Such a text-based "conversation" may continue back and forth, much like a spoken conversation between two (or more) people in the same room.

In most cases, an entire text based "conversation" may occur by sending and receiving text messages. Although described herein as occurring between two individuals, a text messaging conversation can occur between three or more people as well. Often, computer systems are used to run instant messaging software. Also, IM applications are available for virtually any computer system available today, and are also available on many other devices such as PDAs and mobile phones. Illustrative instant messaging applications include America Online's Instant Messenger®), Yahoo Messenger®), and Microsoft's MSN Messenger®. However, embodiments of the invention are not limited to these currently available IM software applications, and may be adapted to new applications and devices as they become available.

In a voice recognition system, a language model generally provides a list of words and phrases, and the probabilities of the occurrence of the words and phrases. Current voice recognition system typically use a dictation based language model when analyzing different n-gram possibilities. That is, given party A said word 1 and word 2, what is the probability that party A will say word 3. By using the text received from an instant messaging application, however, it is possible to create a "conversational" language model. In a conversational language model, probabilities are adjusted to the language model to account for the words spoken by other participants to the conversation. Thus, in a conversational language model the n-gram probability prediction may be stated as the following: given that party B text messaged word 1 and word 2, what is the probability that party A will say word 3. As used herein the term "word" generally refers to a single word in a given language, but also a phrase of words connected in a particular sequence. Also, a word in the context of an n-gram can be less than a word, (e.g., a phoneme).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
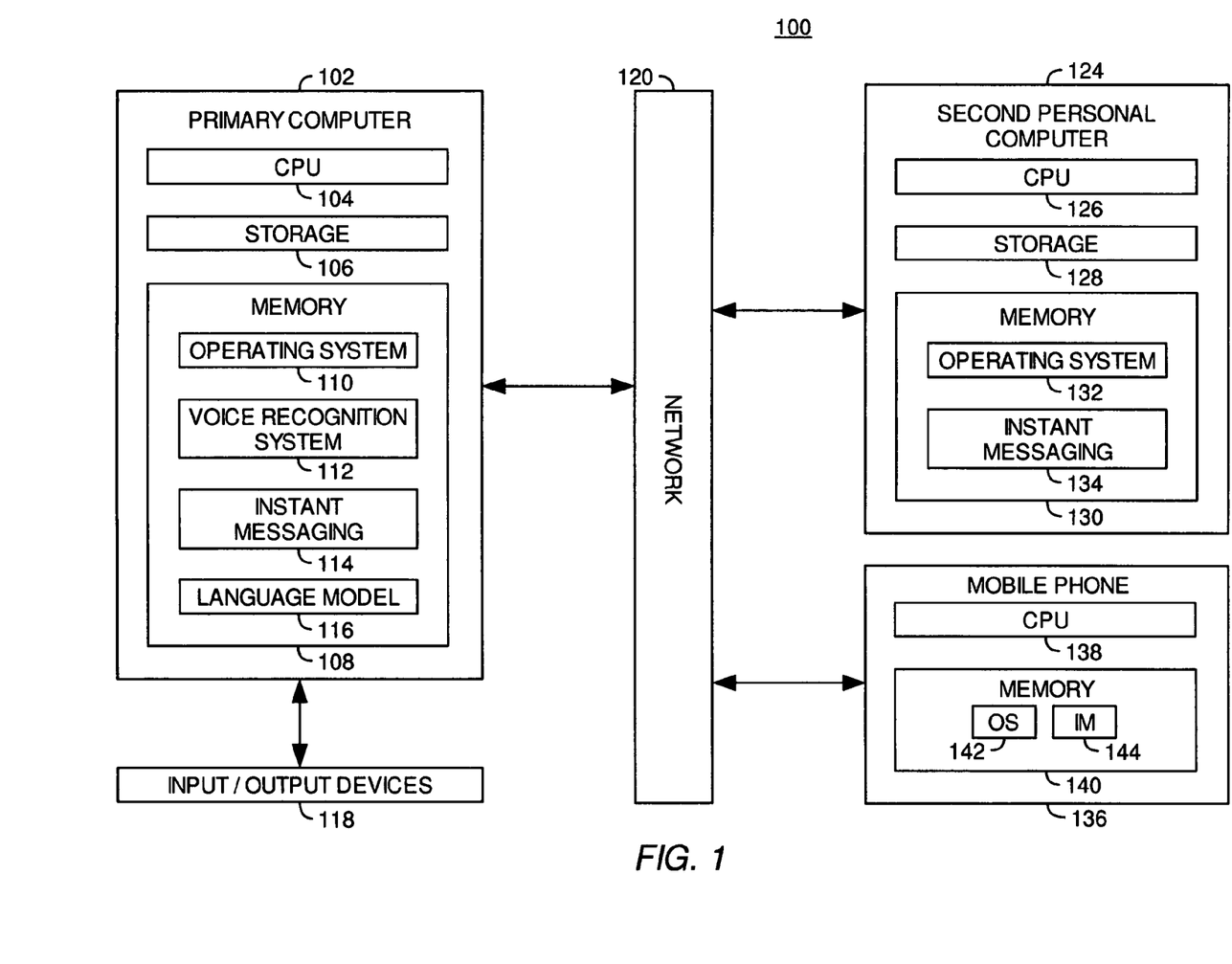
FIG. 1 is a block diagram illustrating a computing environment that includes a voice recognition system configured to provide voice recognition services using a conversational language model, according to one embodiment of the invention.

FIG. 1 is a block diagram illustrating a distributed computer system 100 used to provide voice recognition services, according to one embodiment of the invention. Illustratively, the distributed computer system 100 contains a primary computer 102 having a central processing unit (CPU) 104, storage 106, and memory 108 (e.g., random access memory, read only memory, and the like). Additionally the primary computer 102 may be coupled to a plurality of peripheral devices 118. The peripheral devices 118 may include devices used to capture a user's voice patterns (e.g., a microphone). Memory 108 may contain executing software applications such as an operating system 110, a voice recognition system 112, and an instant messaging application 114.

In one embodiment, voice recognition system 112 may be configured to translate sound patterns into a text based representation of the words spoken by a conversation participant. A language model 116 contains a list of words that may be spoken while a person uses voice recognition system 112, and a list of numerical probability values associated with those words. In one embodiment, the list may be represented as a plurality of n-grams. Thus, the voice recognition system 112 relies on language model 116 in performing voice recognition actions.

The primary computer 102 may be configured to communicate with other devices connected to a data communication network 120. One such device also connected to the network 120 includes a second personal computer 124. The second personal computer may include a CPU 126, storage 128, and memory 130. Memory 130 may contain an operating system 132 and an instant messaging application 134. Users may engage in text-based "conversations" with one another using instant messaging applications 114 and 134. In one embodiment, the text messages for one participant to the conversation may be generated by voice recognition system 112. For example, a user may dictate a desired text message into a microphone, and in response, the voice recognition system 112 may be configured to generate a text based representation of what has been said. Subsequently, the IM application 114 may generate and transmit the text message to a user of the second personal computer system 124. In response, a text-message may be received from the user interacting with IM application 134. The voice recognition system 112 may receive this message as "external text" used to select n-grams from language model 116 and to adjust the word-usage probabilities associated with certain n-grams in language model 116.

Another device that may communicate over the data communication network 120 includes a mobile phone 136. A mobile phone 136 may also contain a CPU 138 and memory 140. Within the memory 140 may be an operating system 142 and an instant messaging application 144. The mobile phone's instant messaging application 144 may also be used to transmit instant messages between the mobile phone 136 and the primary computer 102 or another mobile phone. In yet another embodiment, the mobile phone 136 may contain a voice recognition system, a language model, and an instant messaging application 144. In such an embodiment, the voice recognition process may be performed on the mobile phone 136 as well. The voice recognition system, voice recognition techniques, devices, and network described herein, however, are not limited to the computing environment 100 illustrated in FIG. 1, and may be adapted to take advantage of new computing systems, platforms, or devices as they become available.

The voice recognition system 112 may be configured to translate words dictated by a user into a text representation of the words, based on an analysis of the sound patterns of a user's speech. This text may be used to either initiate an instant messaging "session" or respond to one that was initiated by a user of another device on the network such as the second personal computer 124, referred to as a "participant." Thus, the voice recognition system 112 may be used in conjunction with the instant messaging application 114.

Figure 2:
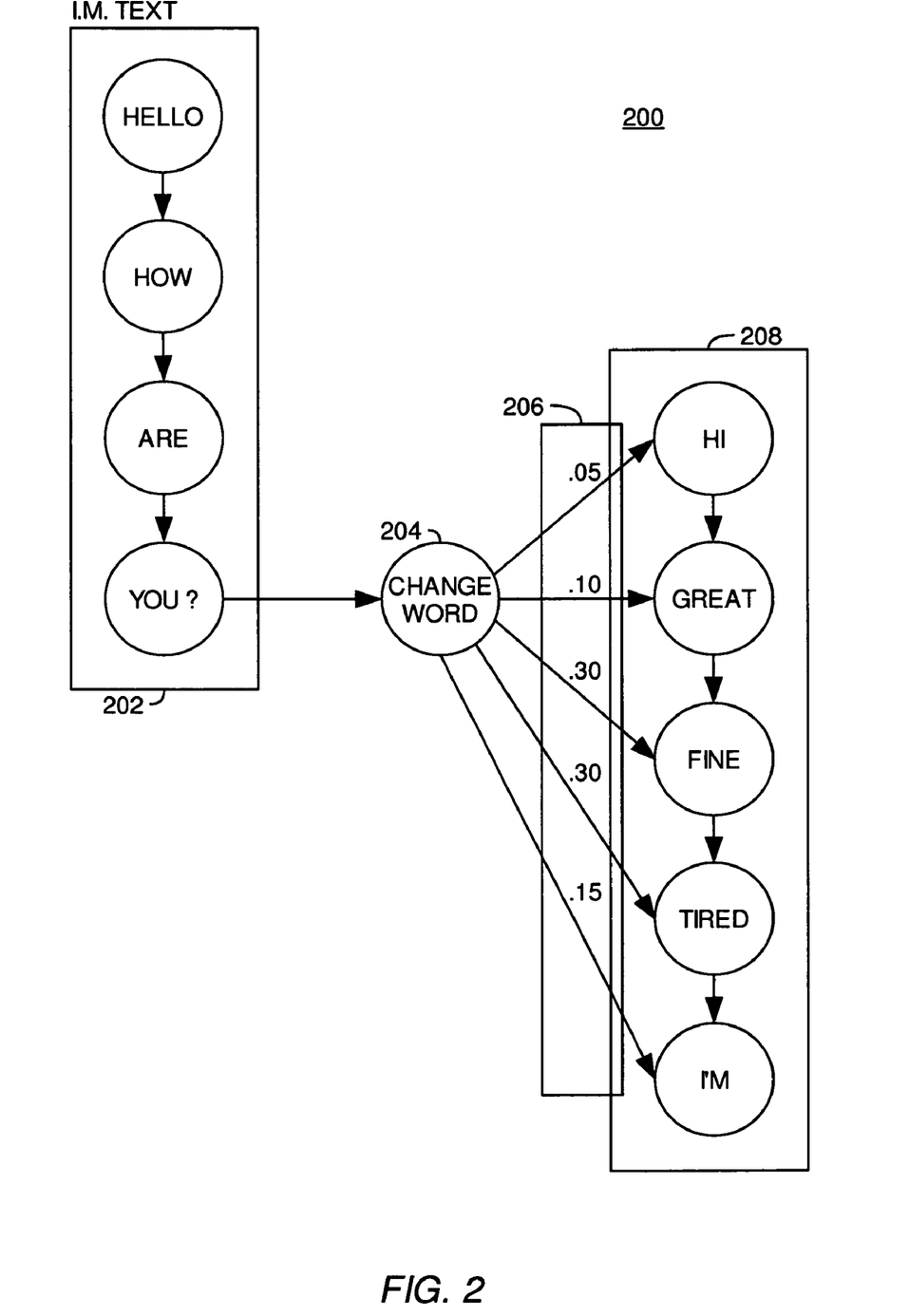
FIG. 2 is a block diagram illustrating an example of an external text message that may be used to adjust word usage probabilities used by a voice recognition system, according to one embodiment of the invention.

As stated above, words selected for a detailed match analysis and comparison by the voice recognition system 112 may be selected based on the n-gram probability that a selected word will follow one or more preceding words. In one embodiment, a text message received by IM application 114 may be supplied to the voice recognition system 112. As used herein, text strings received by the voice recognition system 112 that represent a portion of a text-based conversation are referred to as "external text." The external text may be used to determine which n-grams are selected for analysis and comparison (by selecting n-grams that include the external text). Without the external text, the n-grams selected only represent the words spoken by one participant to the conversation; which would contribute to poor voice recognition accuracy. The external text may also be used to adjust the word-usage probabilities for certain n-grams included in the language model. For example, the probabilities that a particular word will follow one or more preceding words may be greater when a change in speaker has occurred. FIG. 2 illustrates an example of this aspect of the invention. After translating the words spoken by a user into a text-based representation, the voice recognition system 112 may output the text to the IM application.

FIG. 2 is a block diagram illustrating the process of a voice recognition system 112 modifying the language model 116, according to one embodiment of the invention. As described above, an n-gram language model 116 may provide a table of n-grams. Each n-gram provides the probability that the word listed in the n-gram will be the next one spoken by the user of the voice recognition system 112, based on the other words in the n-gram. In other words, given that words X, Y, and Z were spoken, the probability that word A will be spoken next. FIG. 2 illustrates a typical instant message 202 that may be transmitted from one participant to another. As shown, instant message 202 includes the text message: "hello, how are you?".

In one embodiment, the voice recognition system 112 may record a history of the words "spoken" by conversation participants. As used herein, the sequence of words in a conversation is referred to as a "conversation stream" or just "stream." The stream may include a sequence of words, in the order spoken by participants to the conversation, either recognized by the voice recognition system or received as external text. Additionally, the stream may indicate when a change in speaker occurs. The change word 204 is a special word or marker that is inserted into the conversation stream whenever the speaker changes. Thus, the words from the message 202 "hello, how are you" are recorded into the stream and then appended with a change marker or change word 204. The message 202 may then be processed by the voice recognition system 112 and used to adjust the probabilities for certain words in the language model 116 using change values 206.

Block 208 illustrates a number of words that may follow message 202. Each of these words may be used to construct an n-gram based on the words in message 202. Based on the change values 206 listed for each word, the probabilities associated with these n-grams may be adjusted to reflect a change in speaker. For example, consider n-gram that includes (fine | hello how are you), change value 206 illustrates that this n-gram should have its probability increased by "0.3". The other words listed in block 208 illustrate additional common examples of words with a probability that would be changed based on the preceding phrase: "hello, how are you." The probability of the words in block 208 are increased, as the probability of a user speaking the word "great," in response to the phrase "hello how are you" is greater than the probability of the word "great" following the phrase "hello how are you" when the words are spoken by the same speaker. Thus, using external text 112 to select n-grams improves the accuracy of a voice recognition system 112. In addition to increasing the probability of certain words, the probability of some n-grams may be decreased as well. Doing so may exclude certain words from being considered for a detailed analysis and comparison by the voice recognition system 112, allowing other more promising candidates to be selected.

Figure 3:
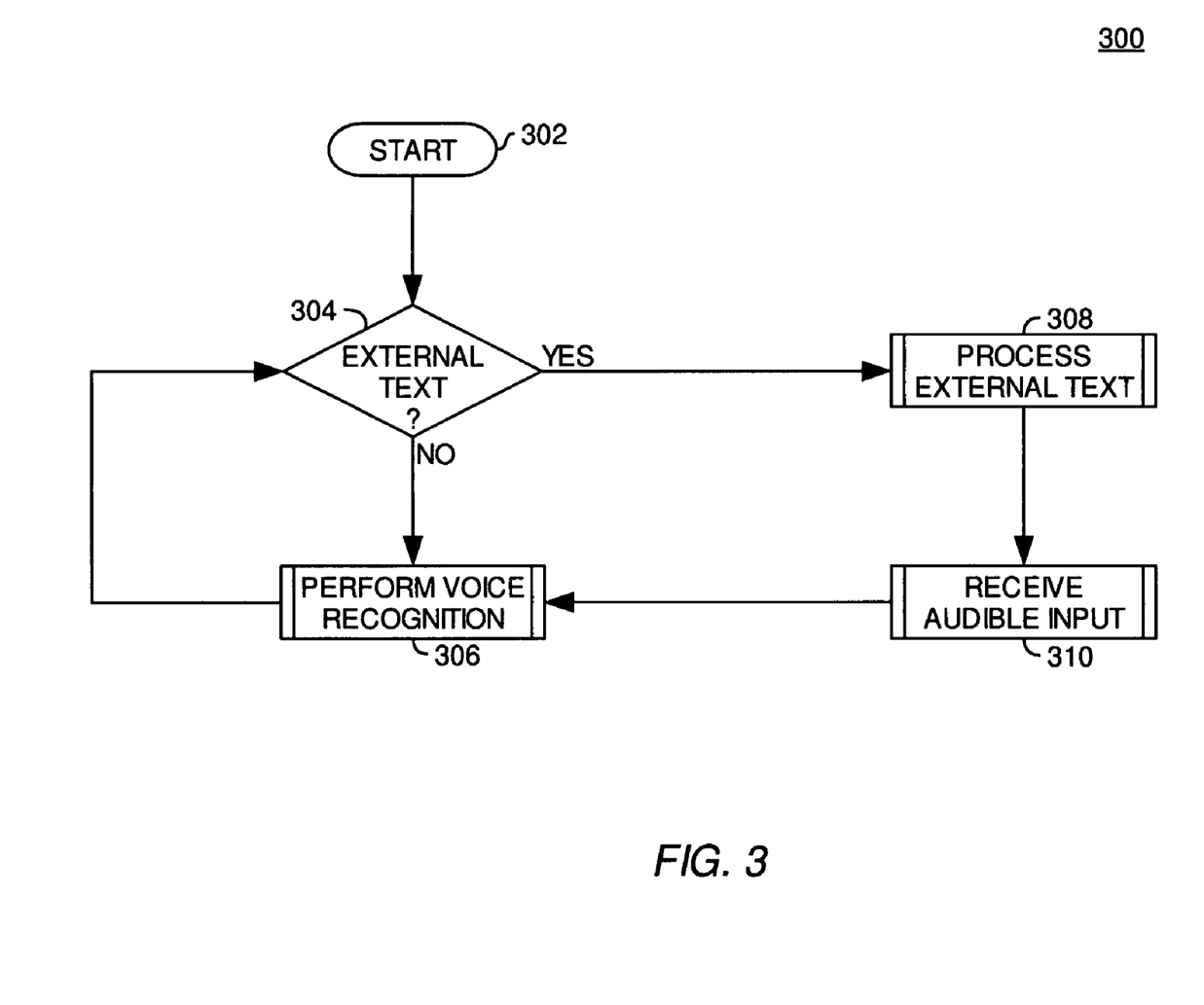
FIG. 3 is a flow chart illustrating a method for providing voice recognition services to one participant in a conversation, according to one embodiment of the invention.

FIG. 3 illustrates a method 300 for a voice recognition system 112 to recognize words spoken by one participant to a conversation, according to one embodiment of the invention. The method 300 begins at 302 when, for example, a user of the primary personal computer 102 initiates an instant messaging session with another individual. The participants in the instant messaging session may communicate over the data communication network 120. At step 304, the voice recognition system 112 determines whether external text has been received from a participant in the instant messaging session. For example, the text in FIG. 2, "hello, how are you" may have been transmitted as a text-message from a conversation participant using IM application 134 to a conversation participant using IM application 114. In such a scenario, the voice recognition system processes the external text as illustrated by step 308. Actions that may be performed at this step are further illustrated in FIG. 4. In one embodiment, the processing that occurs at step 308 may include adjusting the language model to account for the external text.

At step 310, after processing the external text, the voice recognition system 112 then sets the model state for the language model 116 to reflect a change in the "speaker" of the conversation. This may be accomplished by inserting a change word or change marker 204 into the stream as described further in FIG. 4. At step 310, the voice recognition system 112 sets the language model state to reflect that external text has been appended to the end of the conversation stream. In response, the voice recognition system 112 may perform voice recognition functions using n-grams and word probabilities that reflect the external text included in the conversation stream.

Figure 5:
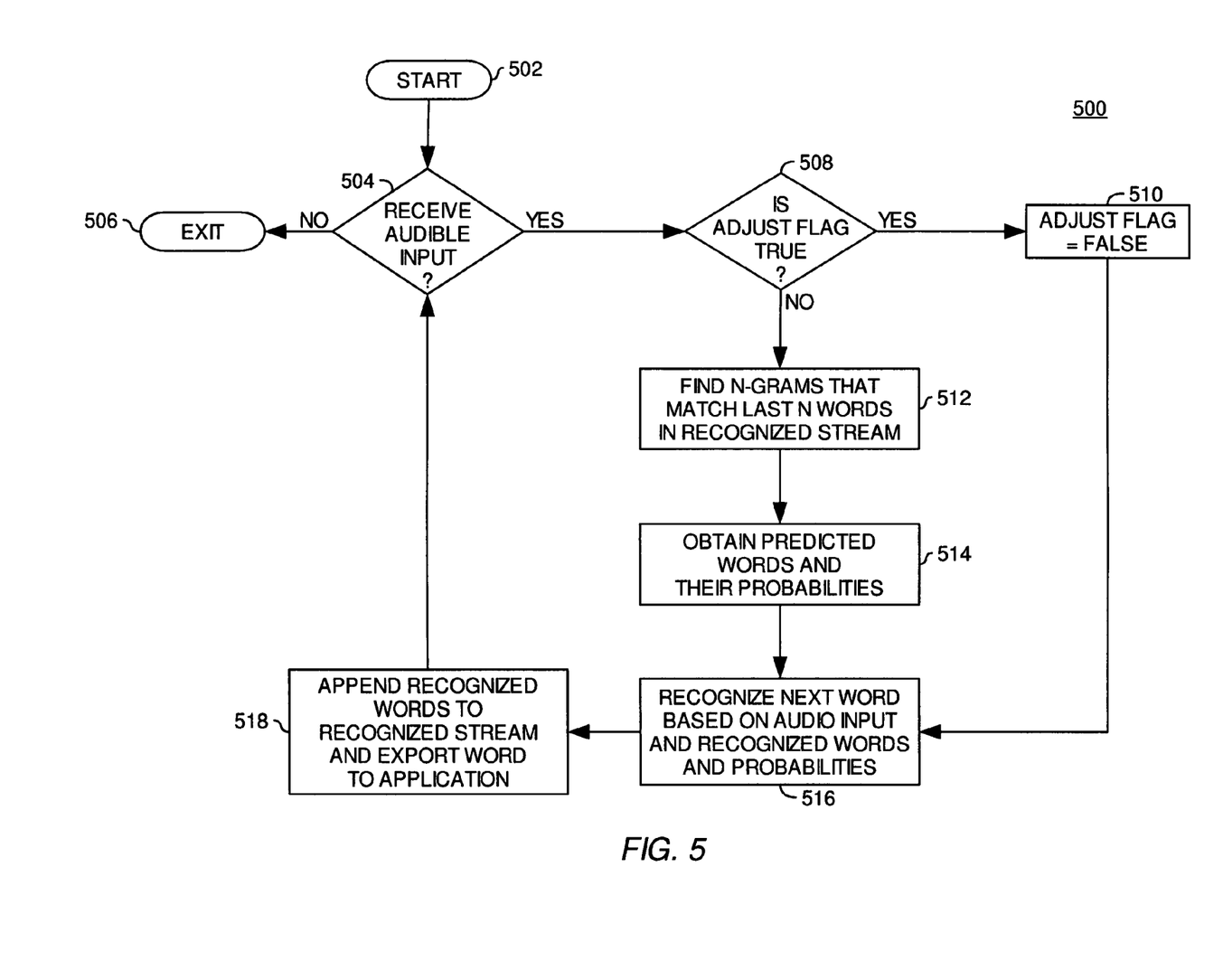
FIG. 5 is a flow chart illustrating a method for performing voice recognition translations using a conversational language model, according to one embodiment of the invention.

After setting the model state, at step 306, the voice recognition system 112 performs voice recognition using audible input spoken by a user. FIG. 5 illustrates actions that may be performed by the voice recognition system 112 as part of step 306. While the user continues to dictate a message, the voice recognition system 112 generates a text-based representation of the user's spoken words. In one embodiment, the text-based representation may be sent to the instant messaging application for use in a text message as part of a text-based conversation. When the user completes dictating the message, the voice recognition system 112 may pause and wait to receive an external text representation of words "spoken" by another participant to the conversation (e.g., a user of IM applications 134 or 144). Once received, the external text may be appended to the conversation stream and used to adjust the n-gram probabilities of the language model. The method 300 then returns to step 304. If no external text is received before the user begins dictating a subsequent message, then the method proceeds directly to step 306 from step 304 and performs voice recognition actions.

Figure 4:
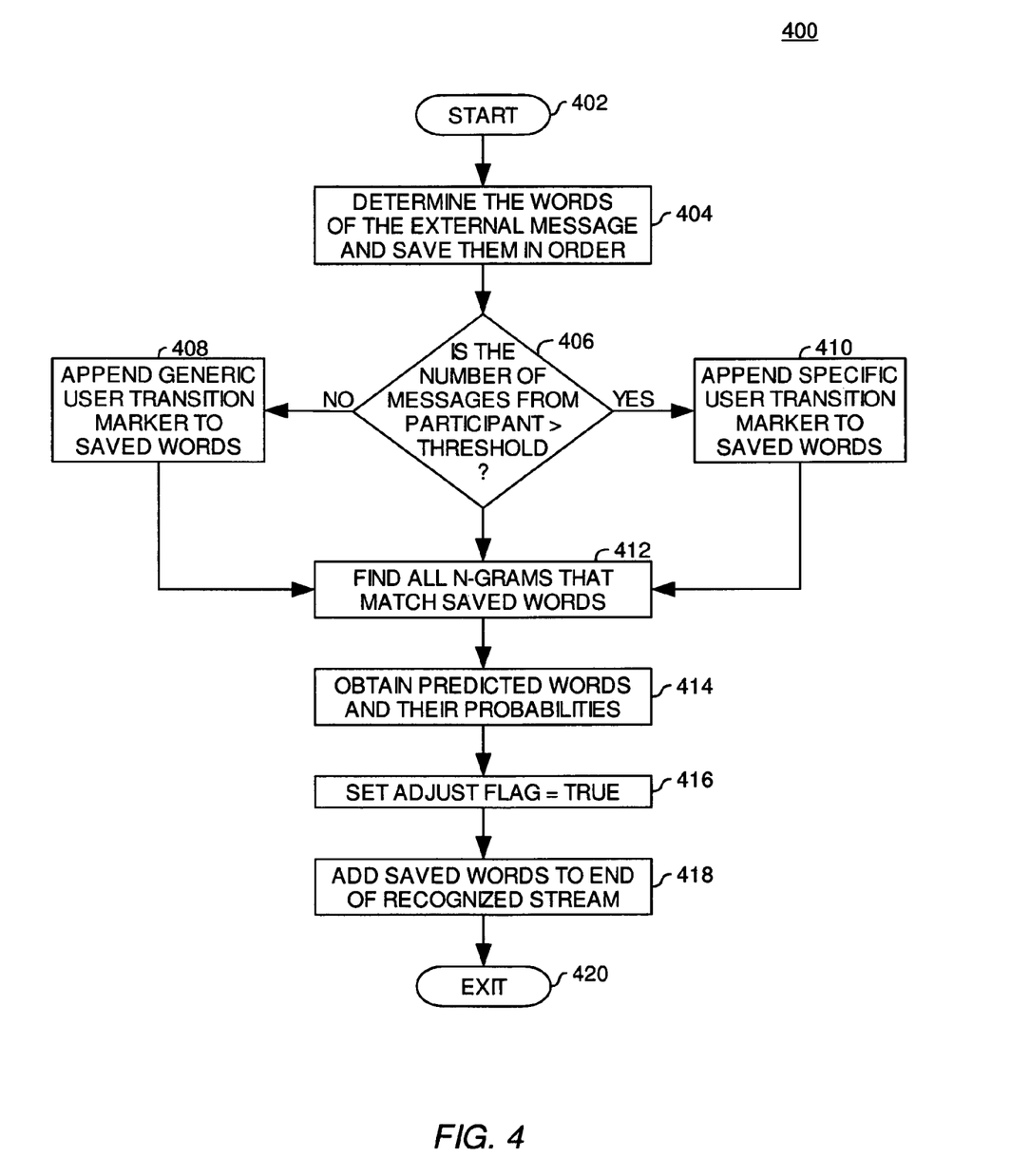
FIG. 4 is a flow chart illustrating a method for a voice recognition system to process external text representing a portion of a conversation, according to one embodiment of the invention.

FIG. 4 illustrates a method for processing external text received by a voice recognition system 112, according to one embodiment of the invention. The method 400 further illustrates actions performed as part of step 308 of method 300. At step 404, the voice recognition system 112 determines the words received by the instant messaging application and appends the conversation stream with them. For example, if the user of the primary computer 102 receives the message "Hello, how are you?", then voice recognition system 112 extracts the phrase "Hello how are you" from the instant messaging application 114 and stores the words "hello how are you" in the conversation stream.

In one embodiment, the voice recognition system may be configured to adjust word probabilities based on the specific participants to a text-based "conversation." Accordingly, at step 406 the voice recognition system 112 determines whether the number of external text messages from a particular conversation participant exceeds a threshold. For example, the threshold may depend on the number of lines of text sent between a pair of participants. Alternatively, the threshold may depend on the number of instant messaging sessions that have been held between the same participants. If the result of the query is that the number of messages from the participant exceeds the threshold, the method 400 proceeds to step 410. At step 410, the voice recognition system 112 will append the saved string of words from the instant messaging conversation with a participant-specific transition marker. The transition marker indicates a change in speaker within the conversation stream. By saving strings of words sent by a specific participant and the response words to that specific string in the language model 116, the voice recognition system 112 may be able to predict more accurately future responses to the same words sent by the same specific participant.

Returning to step 406, if the result of the query is that the number of messages from the participant is less than a threshold value, then the voice recognition system 112 will proceed to step 408. This branch also occurs in a voice recognition system that is not configured to account for the specific participants to a conversation. At step 408, the voice recognition system 112 appends the saved string of words from the instant messaging conversation with an indicator such as a change word 204 or a generic transition marker. The generic transition marker may indicate to the voice recognition system 112 that the string of saved words was received by the voice recognition system as external text. Thus, whether marked as participant specific or generic, the transitions indicate when a change in speaker has occurred in the conversation stream.

At step 412, the voice recognition system 112 determines a set of n-grams that match the words saved by the voice recognition system in step 404. That is, the n-grams matching the last n-words of the conversation stream is determined. At step 414, the word probabilities for these n-grams are identified. In one embodiment, the word probabilities for the n-grams may reflect adjustments based on a change in speaker. For example, change adjustments like the ones illustrated in FIG. 2 may be applied to a selected set of n-grams. Next, the voice recognition system 112 proceeds to step 416 where an adjust flag is set to true. In one embodiment, the adjust flag indicates that external text has been received by the user's instant messaging application 114 and that the external text has been processed by the voice recognition system 112. Next the voice recognition system 112 proceeds to step 418 where the words that were saved in step 404 are added to the end of the conversation stream. After step 418, the method 400 exits at step 420.

FIG. 5 illustrates a method 500 for performing voice recognition within a voice recognition system 112, according to one embodiment of the invention. At step 502 a query is performed to determine if there is audible input via a microphone or other input/output device 118. If there is no audible input the method proceeds to exit at step 506. Otherwise, at step 508, the voice recognition system 112 may determine whether the adjust flag is set to "true." If so, then the voice recognition system 112 has previously processed external text. In such a case, the voice recognition system 112 has been configured to use probabilities associated with the n-grams constructed from the external text when determining probabilities for the next word that may be spoken. At step 510, the adjust flag is returned to a value of false.

If the adjust flag is not set to "true," then at step 512, the voice recognition system 112 identifies a set of n-grams in the language model 116 that match the last n words in the conversation stream. In this case, the conversation stream will contain a sequence of words previously dictated by the user and recognized by voice recognition system 112. In step 514, the voice recognition system 112 obtains the predicted words and their associated probabilities for the identified n-grams. At step 516, the voice recognition system translates the words dictated by the user into a text representation of the words, based on, for example, an analysis of the speech patterns and the retrieved probabilities of the n-gram candidates. In the case where external text was received, the word probabilities have been adjusted accordingly. The translation may be based on an analysis of the user's voice patterns and a comparison of that analysis to the language model 116. In doing so the voice recognition system 112 will use the word probabilities that were obtained in either step 514 (using n-grams that do not represent a sequence of external text), or the probabilities obtained in step 414 of method 400 (using n-grams that do include sequences of external text).

At step 518, the voice recognition system 112 appends the translated words recognized in step 514 to the conversation stream. Additionally, the voice recognition system 112 may export the recognized word to an application. For example, a text-based representation of the recognized words may be supplied to instant messaging application 114. The method 500 them proceeds to step 504 where the loop determines if there is additional input for processing into text by the voice recognition system 112. If so, the method 500 continues by returning to step 508 and proceeds as described above, otherwise the method 500 exits at step 506.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing voice recognition, at least in part, using a language model incorporating a plurality of words and a plurality of n-grams, each of the plurality of n-grams formed by two or more of the plurality of words and defining a probability of occurrence of each word in the respective n-gram given the occurrence of one of the two or more of the plurality of words forming the respective n-gram, the method comprising:
   receiving a first text comprising a sequence of one or more words from a first participant in a text-based conversation with a second participant via at least one first user device;
   receiving a voice response provided by the second participant in the text-based conversation in response to the first text;
   selecting at least one of the plurality of n-grams from the language model that includes at least one word in the first text; and
   automatically recognizing at least a portion of the voice response to provide a second text, at least in part, by using the at least one selected n-gram;
   maintaining a history of recognized words and received texts in the text-based conversation; and
   maintaining an identifier representing a change in speaker from the first or the second participant to the other.

2. The method of claim 1, wherein the at least one first user device includes an instant messaging application, and wherein the first text is an instant message received by the second participant to the conversation via at least one second user device.

3. The method of claim 2, wherein the at least one first user device and/or the at least one second user device comprises a mobile telephone.

4. The method of claim 1, further comprising adjusting the probability for at least one word in the at least one selected n-gram based, at least in part, on the first text.

5. The method of claim 4, wherein the probability for the at least one candidate word of the at least one of the plurality of n-grams is increased.

6. The method of claim 4, wherein the probability for the at least one candidate word of the at least one of the plurality of n-grams is decreased.

7. At least one non-transitory computer-readable storage medium containing a program which, when executed on at least one computer, performs a method of performing voice recognition, at least in part, using a language model incorporating a plurality of words and a plurality of n-grams, each of the plurality of n-grams formed by two or more of the plurality of words and defining a probability of occurrence of each word in the respective n-gram given the occurrence of one of the two or more of the plurality of words forming the respective n-gram, the method comprising:
   receiving a first text comprising a sequence of one or more words from a first participant in a text-based conversation with a second participant via at least one first user device;
   receiving a voice response provided by the second participant in the text-based conversation in response to the first text;
   selecting at least one of the plurality of n-grams from the language model that includes at least one word in the first text; and
   automatically recognizing at least a portion of the voice response to provide a second text, at least in part, by using the at least one selected n-gram;
   maintaining a history of recognized words and received texts in the text-based conversation; and
   maintaining an identifier representing a change in speaker from the first or the second participant to the other.

8. The at least one non-transitory computer-readable storage medium of claim 7, wherein the at least one first user device includes an instant messaging application, and wherein the first text is an instant message received by the second participant to the conversation via at least one second user device.

9. The at least one non-transitory computer-readable storage medium of claim 8, wherein the at least one first user device and/or the at least one second user device comprises a mobile telephone.

10. The at least one non-transitory computer-readable storage medium of claim 7, further comprising adjusting the probability for at least one word in the at least one selected n-gram based, at least in part, on the first text.

11. The at least one non-transitory computer-readable storage medium of claim 10, wherein the probability for the at least one candidate word of the at least one of the plurality of n-grams is increased.

12. The at least one non-transitory computer-readable storage medium of claim 10, wherein the probability for the at least one candidate word of the at least one of the plurality of n-grams is decreased.

13. A computing device that performs voice recognition, at least in part, using a language model incorporating a plurality of words and a plurality of n-grams, each of the plurality of n-grams formed by two or more of the plurality of words and defining a probability of occurrence of each word in the respective n-gram given the occurrence of one of the two or more of the plurality of words forming the respective n-gram, the computing device comprising:
   at least one input to receive a first text comprising a sequence of one or more words from a first participant in a text-based conversation with a second participant via at least one user device and receive a voice response provided by the second participant in the text-based conversation in response to the first text; and
   at least one processor coupled to the at least one input, the at least one processor programmed to:
      select at least one of the plurality of n-grams from the language model that includes at least one word in the first text; and
      automatically recognize at least a portion of the voice response to provide a second text, at least in part, by using the at least one selected n-gram;
      maintain a history of recognized words and received texts in the text-based conversation; and
      maintain an identifier representing a change in speaker from the first or the second participant to the other.

14. The computing device of claim 13, wherein the at least one user device comprises an instant messaging application, and wherein the first text is an instant message received by the second participant to the conversation.

15. The computing device of claim 13, wherein the computing device and/or the at least one first user device comprises a mobile telephone.

16. The computing device of claim 13, wherein the at least one processor is further programmed to adjust the probability for at least one word in the at least one selected n-gram based, at least in part, on the first text.

17. The computing device of claim 16, wherein the probability for the at least one candidate word of the at least one of the plurality of n-grams is increased.

18. The computing device of claim 16, wherein the probability for the at least one candidate word of the at least one of the plurality of n-grams is decreased.

19. A computer-implemented method for performing voice recognition, at least in part, using a language model incorporating a plurality of words and a plurality of n-grams, each of the plurality of n-grams formed by two or more of the plurality of words and defining a probability of occurrence of each word in the respective n-gram given the occurrence of one of the two or more of the plurality of words forming the respective n-gram, the method comprising:
- receiving a first text comprising a sequence of one or more words from a first participant in a text-based conversation with a second participant via at least one first user device;
- receiving a voice response provided by the second participant in the text-based conversation in response to the first text;
- selecting at least one of the plurality of n-grams from the language model that includes at least one word in the first text; and
- automatically recognizing at least a portion of the voice response to provide a second text, at least in part, by using the at least one selected n-gram, wherein automatically recognizing comprises determining whether a number of messages from the first participant to the second participant exceeds a predetermined threshold.

20. The computer-implemented method of claim 19, further comprising adjusting the probability for at least one word in the at least one selected n-gram based, at least in part, on the first text.

21. The computer-implemented method of claim 19, wherein when the number of messages from the first participant to the second participant exceeds a predetermined threshold, automatically recognizing the at least a portion of the voice response includes using a history of recognized words and received texts between the first participant and the second participant.

22. At least one non-transitory computer-readable storage medium containing a program which, when executed on at least one computer, performs a method of performing voice recognition, at least in part, using a language model incorporating a plurality of words and a plurality of n-grams, each of the plurality of n-grams formed by two or more of the plurality of words and defining a probability of occurrence of each word in the respective n-gram given the occurrence of one of the two or more of the plurality of words forming the respective n-gram, the method comprising:
- receiving a first text comprising a sequence of one or more words from a first participant in a text-based conversation with a second participant via at least one first user device;
- receiving a voice response provided by the second participant in the text-based conversation in response to the first text;
- selecting at least one of the plurality of n-grams from the language model that includes at least one word in the first text; and
- automatically recognizing at least a portion of the voice response to provide a second text, at least in part, by using the at least one selected n-gram, wherein automatically recognizing comprises determining whether a number of messages from the first participant to the second participant exceeds a predetermined threshold.

23. The at least one non-transitory computer-readable storage medium of claim 22, further comprising adjusting the probability for at least one word in the at least one selected n-gram based, at least in part, on the first text.

24. The at least one non-transitory computer-readable storage medium of claim 22, wherein when the number of messages from the first participant to the second participant exceeds a predetermined threshold, automatically recognizing the at least a portion of the voice response includes using a history of recognized words and received texts between the first participant and the second participant.

25. A computing device that performs voice recognition, at least in part, using a language model incorporating a plurality of words and a plurality of n-grams, each of the plurality of n-grams formed by two or more of the plurality of words and defining a probability of occurrence of each word in the respective n-gram given the occurrence of one of the two or more of the plurality of words forming the respective n-gram, the computing device comprising:
- at least one input to receive a first text comprising a sequence of one or more words from a first participant in a text-based conversation with a second participant via at least one user device and receive a voice response provided by the second participant in the text-based conversation in response to the first text; and
- at least one processor coupled to the at least one input, the at least one processor programmed to:
  - select at least one of the plurality of n-grams from the language model that includes at least one word in the first text; and
  - automatically recognize at least a portion of the voice response to provide a second text, at least in part, by using the at least one selected n-gram,
  - wherein the at least one processor is programmed to automatically recognize at least a portion of the voice response at least in part by determining whether a number of messages from the first participant to the second participant exceeds a predetermined threshold.

26. The computing device of claim 25, wherein the at least one processor is configured to adjust the probability for at least one word in the at least one selected n-gram based, at least in part, on the first text.

27. The computing device of claim 25, wherein when the number of messages from the first participant to the second participant exceeds a predetermined threshold, the at least one processor is configured to automatically recognize the at least a portion of the voice response includes using a history of recognized words and received texts between the first participant and the second participant.

* * * * *